United States Patent
Yruski et al.

(10) Patent No.: US 8,082,184 B2
(45) Date of Patent: Dec. 20, 2011

(54) CONSUMER DRIVEN PRICE MARKETPLACE

(75) Inventors: Andrey Yruski, San Francisco, CA (US); Semion Yaruski, San Francisco, CA (US)

(73) Assignee: Chiching, Inc., San Francisco, CA (US)

( * ) Notice: Subject to any disclaimer, the term of this patent is extended or adjusted under 35 U.S.C. 154(b) by 22 days.

(21) Appl. No.: 12/730,206

(22) Filed: Mar. 23, 2010

(65) Prior Publication Data
US 2010/0250391 A1 Sep. 30, 2010

Related U.S. Application Data

(60) Provisional application No. 61/162,979, filed on Mar. 24, 2009.

(51) Int. Cl.
*G06Q 30/00* (2006.01)
(52) U.S. Cl. .................. 705/26.3; 705/26.4; 705/26.41; 705/26.42; 705/26.44
(58) Field of Classification Search .............. 705/26.3, 705/26.4, 26.41, 26.42, 26.44
See application file for complete search history.

(56) References Cited

U.S. PATENT DOCUMENTS

| 7,590,589 B2 * | 9/2009 | Hoffberg | 705/37 |
| 7,765,141 B1 * | 7/2010 | Innocenti | 705/37 |
| 2001/0042041 A1 * | 11/2001 | Moshal et al. | 705/37 |
| 2003/0014348 A1 * | 1/2003 | O'Connor et al. | 705/37 |
| 2005/0283426 A1 * | 12/2005 | Krishnasami et al. | 705/37 |
| 2008/0262945 A1 * | 10/2008 | Clark | 705/27 |
| 2008/0288367 A1 * | 11/2008 | Watson et al. | 705/27 |

FOREIGN PATENT DOCUMENTS

WO WO-2006/063086 A2 * 6/2006

OTHER PUBLICATIONS

Anon., "The Great Rock and Roll Auction; Put in Lowest Unique Bid and Get Tickets for Live8, Oasis, U2 or Coldplay," Sunday Mail, Glasgow, p. 6, Jun. 19, 2005.*
Anon., "The Emetrics Summit Announces Speaker Roster and Agenda for the Big Picture Event in San Francisco, May 7-9, 2007," Market Wire Incorporated, Mar. 13, 2007.*

* cited by examiner

*Primary Examiner* — Nicholas D Rosen
(74) *Attorney, Agent, or Firm* — Perkins Coie LLP

(57) ABSTRACT

An online marketplace is established where sellers compete by offering to sell a mass quantity of a specific product, referenced by a unique product ID. A successful sale is determined at a time that maximizes a group of buyers' offers for the specific product. At the determined time, both the sellers' offers and the buyers' offers for the specific product are separately sorted from the lowest price offer to highest price offer. Competing sellers are awarded sales contingent on one or more buyer offers remaining after each seller having a lower sell price is satisfied for its entire quantity. Sells for each successful seller are satisfied starting from a buyer's offer having a lowest buy price and increasing to successively higher buy prices of the remaining buyers' offers, until the seller's entire quantity of the listed product is satisfied.

37 Claims, 9 Drawing Sheets

CONSUMER DRIVEN PRICE MARKETPLACE

CROSS-REFERENCES TO RELATED APPLICATIONS

This is a continuation of provisional U.S. patent application No. 61/162,979, filed on Mar. 24, 2009, incorporated herein by reference, and this application claims the benefit thereof.

FIELD

At least certain embodiments of the invention relate generally to online auctions and marketplaces, and more particularly, to a technique for sellers to compete over the Internet to sell large quantities of a particular product to one or more buyers.

BACKGROUND

Auctions are a mechanism used to buy and sell goods by offering a good for sale, taking offers from buyers to purchase the good, and determining a buyer with a winning offer. Auctions provide a process to competitively affect a purchase price of a product by, for example, raising a purchase price by placing increasingly higher bid prices until a highest bid is accepted for the product by the seller, in a forward auction. In a reverse auction, multiple sellers compete to sell a product to a buyer by bidding the purchase price of the product down to a price agreeable to the buyer.

Competition in driving down the purchase price is related to, for example, the number of sellers participating in the sale. The greater the number of sellers offering a product for sale increases a probability that the sellers will successively decrease the purchase price in order to win a sale while still realizing profit. A problem of traditional reverse auctions is accumulating enough sellers offering to sell identical goods in such a quantity to meaningfully decrease purchase prices.

Another problem of traditional reverse auctions is insufficient buyer aggregation. A dearth of bids associated with poor buyer aggregation makes selling products impractical because the sellers' profits are negligible without an adequate number of buyers placing upward pressure on an ultimate purchase price.

Overall, the examples herein of some prior or related systems and their associated limitations are intended to be illustrative and not exclusive. Other limitations of existing or prior systems will become apparent to those of skill in the art upon reading the following Detailed Description.

SUMMARY

An online marketplace is established where a seller competes with other sellers by offering to sell a mass quantity of a particular product to one or more buyers. The marketplace contains a list of products that a seller can offer to sell at the marketplace to the one or more buyers. A seller submits an offer to the marketplace to sell a designated quantity of a specific product listed in the marketplace. A product listed in the marketplace is identified by a unique product identifier, such as a Universal Product Code (UPC), so that all sellers and all buyers bid on a single representative product.

Individual sellers offering to sell the same product as other sellers are not aware of the specific selling terms of the other sellers. However, some terms, such as the total number of bids received and an average bid-price, for example, may be shown to the seller to encourage the seller to lower their sell price to achieve a successful sell. Buyers place an offer, including at least a price and duration, for a listed product. Individual buyers offering to buy the same product as other buyers are not aware of the specific purchase terms of the other buyers; however, some statistics may be shown to the buyer to encourage a successful purchase.

A successful sale between a buyer and a seller for a particular product listed in the marketplace is determined at a time that maximizes the group of buyers bidding for the particular product. At the determined time, both the sellers' offers and buyers' offers for the particular product are separately sorted: sellers' offers are listed, based on sell price, from lowest-to-highest; and buyers' offers are listed, based on buy price, from lowest-to-highest.

A seller with the lowest sell price is awarded sales for each of that seller's quantity of the particular product. Sells are satisfied starting from a buyer offer having a lowest buy price and increasing to successively higher buy prices of the remaining buyers' offers, until the seller's entire quantity of the listed product is satisfied. Other competing sellers are awarded sales contingent on one or more buyer offers remaining after each seller with a lower sell price is satisfied for its entire quantity of the listed product.

The marketplace also provides a system for selling to a buyer a product not contained in the marketplace list.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
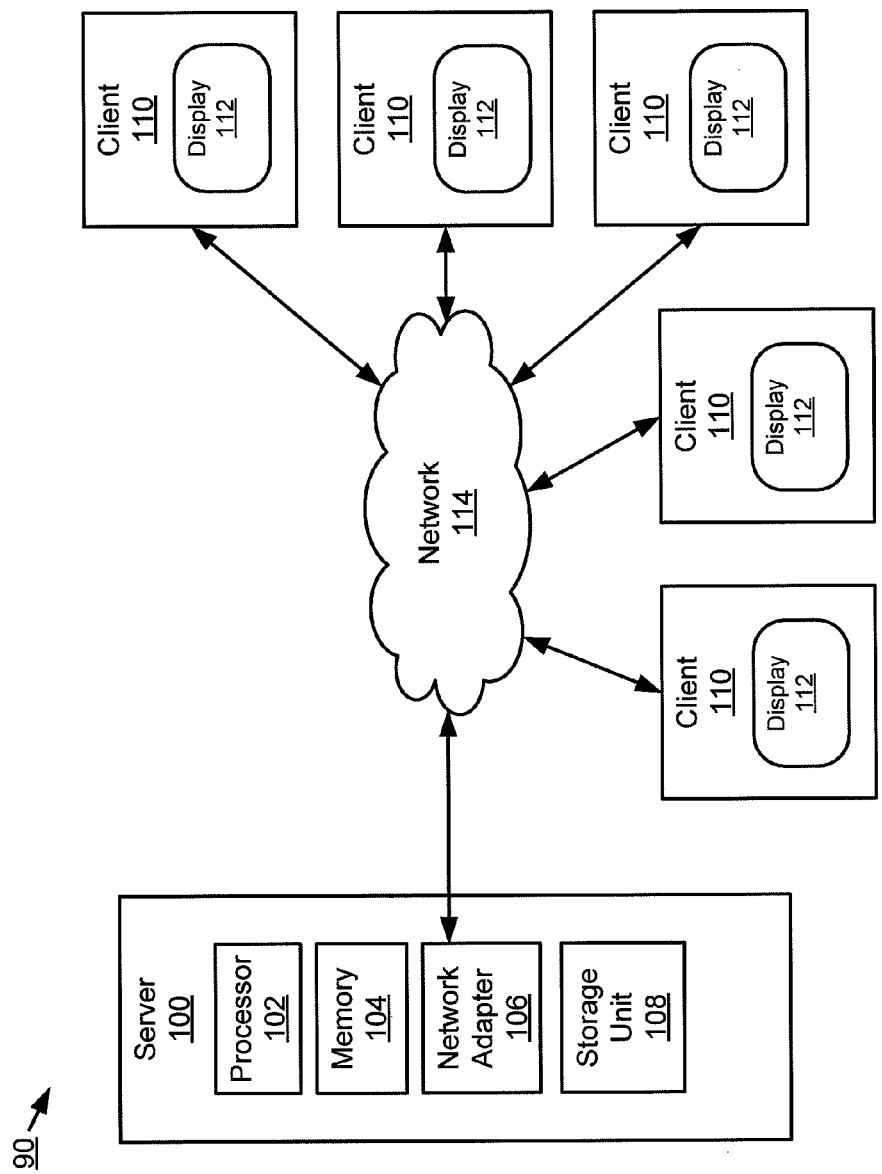
FIG. 1 illustrates an example of the online marketplace implemented using clients communicatively coupled to a marketplace server via a network.

Sellers and buyers of a particular product are maximized into a single aggregation where selling in bulk provides buyers competitive pricing and sellers realize a profit multiplied by mass selling at an instant predetermined for maximum profit probability. Various examples of the invention will now be described.

The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The following discussion provides a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "client," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

FIG. 1 illustrates an example architecture 90 of an online marketplace implemented using clients 110 communicatively coupled to a marketplace server 100 via a network 114. Each client 110 has a display 112 configured to visually present data. Each marketplace server 100 has at least one processor 102, memory 104, network adapter 106, and storage unit 108.

The term "client," as used herein, can be a desktop computer, a laptop, a cell phone, a personal digital assistant (PDA), or any other device having communication capability to connect to the network 114. In one example, the client 110 connects to the network 114 using one or more network adapters, terminal adapters, routers or modems or combinations of the foregoing (in converged network embodiments).

In some instances, the network can be a virtual network such that two or more servers 100 are located at a single physical computing system. Or, in another virtual network instance, one or more clients 110 and one or more servers 100 can reside on a single physical computing system.

In some instances, the network 114 is the Internet, allowing the client 110 to access the marketplace server 100. In some instances, especially where the client 110 is a phone or wireless device, the network 114 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM. Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

A client 110 has a display 112 to present information from a marketplace server 100 to a buyer 212 and seller 210. The display 112 can use any technology suitable for presenting data such as a Liquid Crystal Display (LCD), Light Emitting Diode display (LED), Organic Light Emitting Diode display (OLED), Cathode Ray Tube (CRT) or Plasma Display Panel (PDP).

The term "marketplace server" as indicated herein, refers to an individual or multiple server stations or other computing apparatus. In one embodiment, the marketplace server is a web server capable of hosting a website and storing content (e.g., various webpages) that is associated with the website. In some embodiments, the marketplace server is separate from a web server, but communicates with a web server to provide, manage, and/or control content generated by the web server.

The processor(s) 102 can include central processing units (CPUs) to control the overall operation of, for example, the host computer. In certain embodiments, the processor(s) 102 accomplish this by executing software or firmware stored in memory 104. The processor(s) 102 can be, or can include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 104 is or includes the main memory of the marketplace server 100. The memory 104 represents any form of random access memory (RAM), read-only memory (ROM), flash memory (as discussed above), or the like, or a combination of such devices. In use, the memory 104 can contain, among other things, a set of machine instructions which, when executed by processor 102, causes the processor 102 to perform operations to implement embodiments of the present invention.

Also connected to the processor(s) 102 is a network adapter 106. The network adapter 106 provides the marketplace server 100 with the ability to communicate with remote devices, such as the clients 110.

Also connected to the processor(s) 102 is a storage unit 108. The storage unit 108 represents any form of magnetic disk storage media, optical storage media, flash memory devices, etc. In use, the storage unit 108 receives and retrieves information on behalf of the memory 104, the network adapter 106 and the clients 110.

Figure 2:
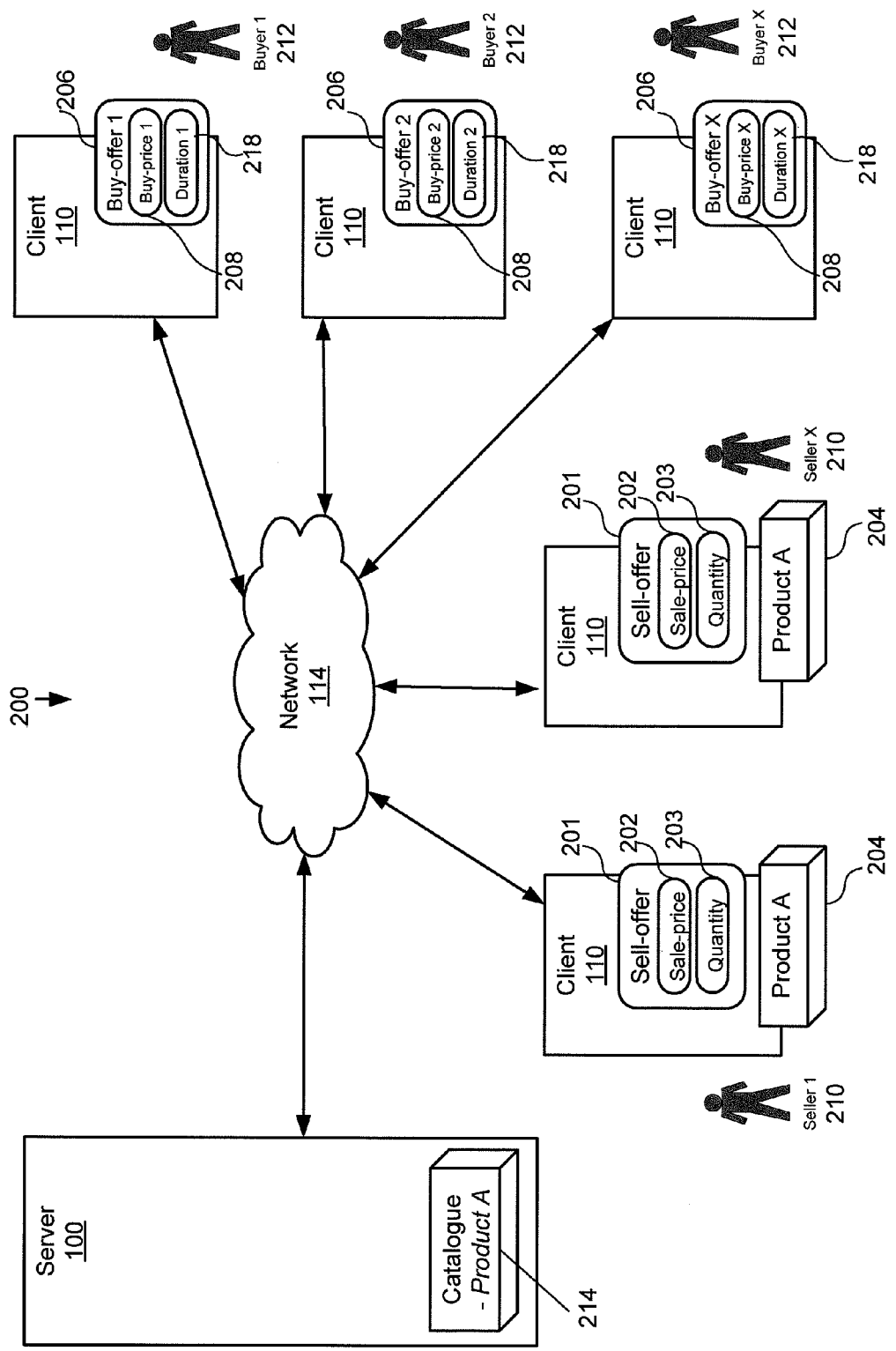
FIG. 2 illustrates a seller, located at a client, offering to sell a specific quantity of a product at a sale price, and multiple buyers, each located at a client, offering to buy, for a specific duration, the product at the designated buy price.

FIG. 2 illustrates an online marketplace 200 where a seller 210 and a buyer 212 interact with a client 110. The seller 210 creates, at the client, a sell-offer 202 having a sale-price 202 and quantity 203 of a product 204 to sell at the server. The buyer 212 creates, at the client, a buy-offer 206 having a buy-price 208 and a duration 218 to purchase the product 204 from the marketplace catalogue 214.

A seller 210 desiring to sell a product 204 locates that product in a catalogue of products 214 in the marketplace server 100. The seller creates, at the client, an offer to sell 201 the product. The offer to sell at least contains a sale-price 202 at which to sell the product and a quantity 203 of the product to sell at the sale-price.

A product listed in the catalogue 214 can only receive one initial sell-offer at a given time. Once a product receives the initial sell-offer, subsequent sell-offers for that product are aggregated with the initial sell-offer to maximize all the sellers of that particular product.

Figure 3:
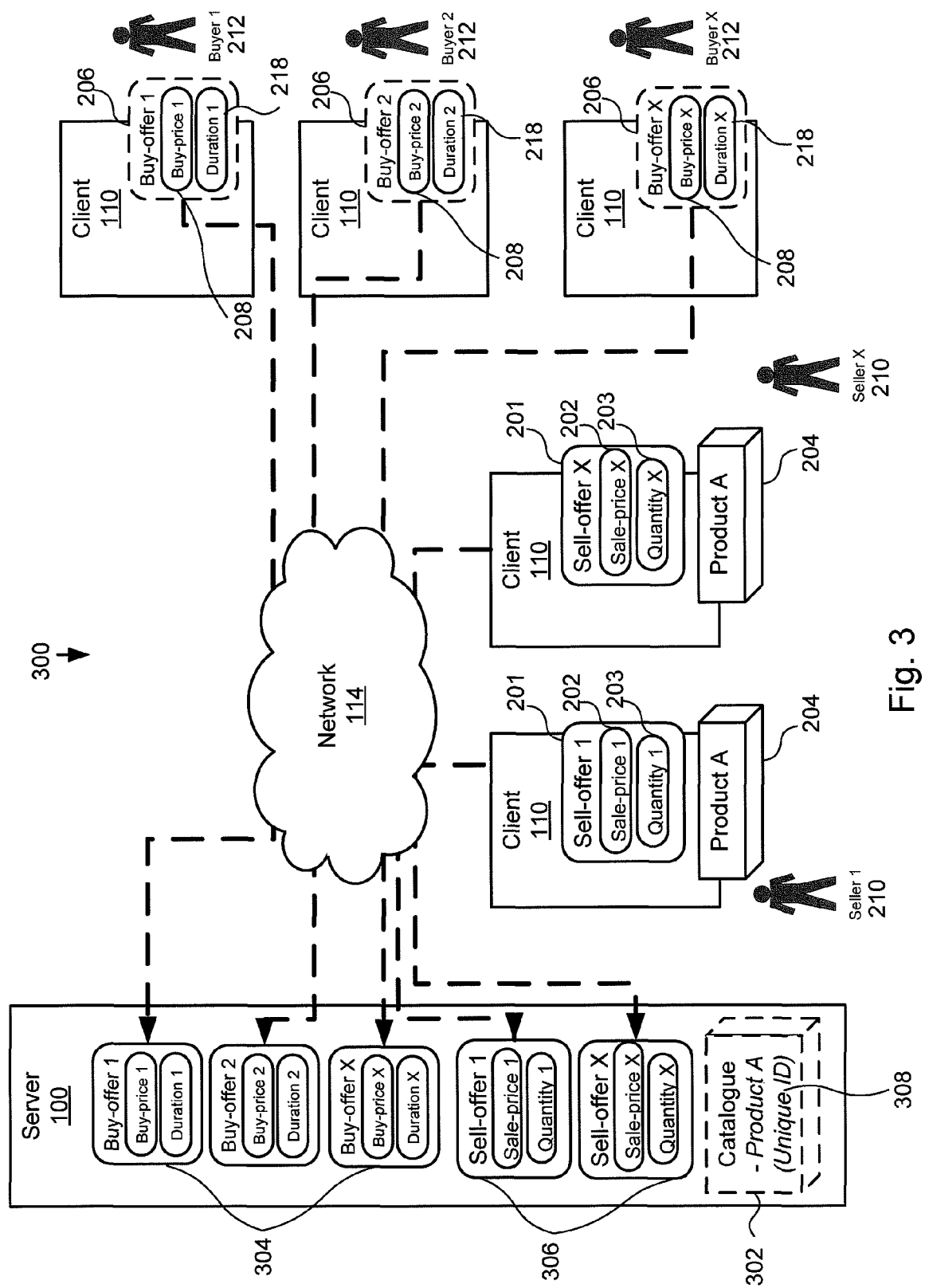
FIG. 3 illustrates a seller and multiple buyers submitting offers from a client to a marketplace server, wherein the seller is selling a product referenced by a unique product identifier, and the multiple buyers are offering to buy the product.

FIG. 3 illustrates an example process 300 of sellers submitting sell-offers 201 and buyers submitting buy-offers 206 for an offered product 302, the offers received, at the marketplace server 100, as numerous buy-offers 304 and sell-offers 306. The offered product 302 represents all identical products (make, model, color, etc) currently offered for sell at the online marketplace 200. In one embodiment, the offered product 302 is assigned and referenced by a unique product identifier 308. The unique product identifier 308 can be any identifier, such as a Universal Product Code (UPC), skew number, bar code, or serial number that identifies all like products by a single reference. By associating an offered product with the unique product identifier 308 all sellers and all buyers compete for a single representative product, increasing the number of sellers placing sell-offers on the offered product and creating more competition driving down an ultimate purchase price. Similarly, associating an offered product 302 with the unique product identifier 308 increases the number of buyers placing buy-offers 304 for the offered product 302. This increased pool of buy-offers in-turn allows the sellers to sell, at a single, mass transaction, higher ("bulk") quantities 203 of the product 204 while achieving higher profitability than traditional auctions and online marketplaces.

In one embodiment, each of the received buy-offers 304 submitted from the clients 110 by the buyers has a buy-price 208. In another embodiment, each buy-offer is coupled with a duration 218 that defines a maximum time threshold that the buy-offer is valid. After the duration expires for a particular buy-offer, that buy-offer is removed from the active buy-offers 304 for the offered product 308.

The determination of successful offers 450 can be initiated at the end of a duration specified in a sell-offer (e.g. 30 days) or at a time before the end of the sell-offer duration, based on a time that maximizes the buy-offers received at the marketplace server. In one embodiment, the processor 102 calculates when a greatest number of submitted buy-offers 304 will decrease due to one or more of the buy-offers expiring and, based on that calculation, the determination of the successful offers 450 is initiated to maximize the buy-offers. In another embodiment, the determination of successful offers is initiated based on a quantity 203 of a sell-offer 201 exceeding a predetermined threshold.

Figure 4:
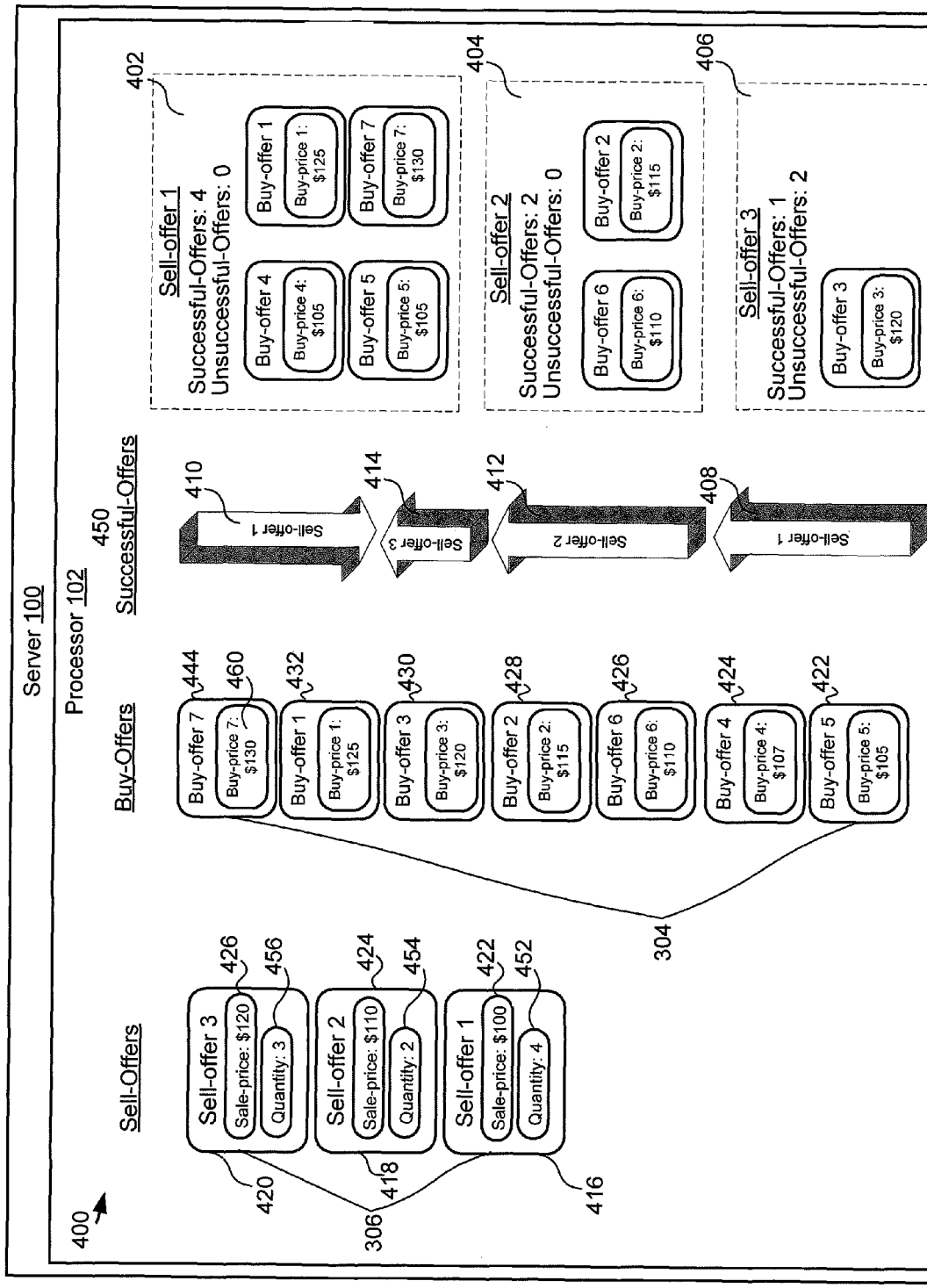
FIG. 4 depicts a processor of a marketplace server determining successful buy-offers and sell-offers for a product sold in the marketplace.
Figure 9:
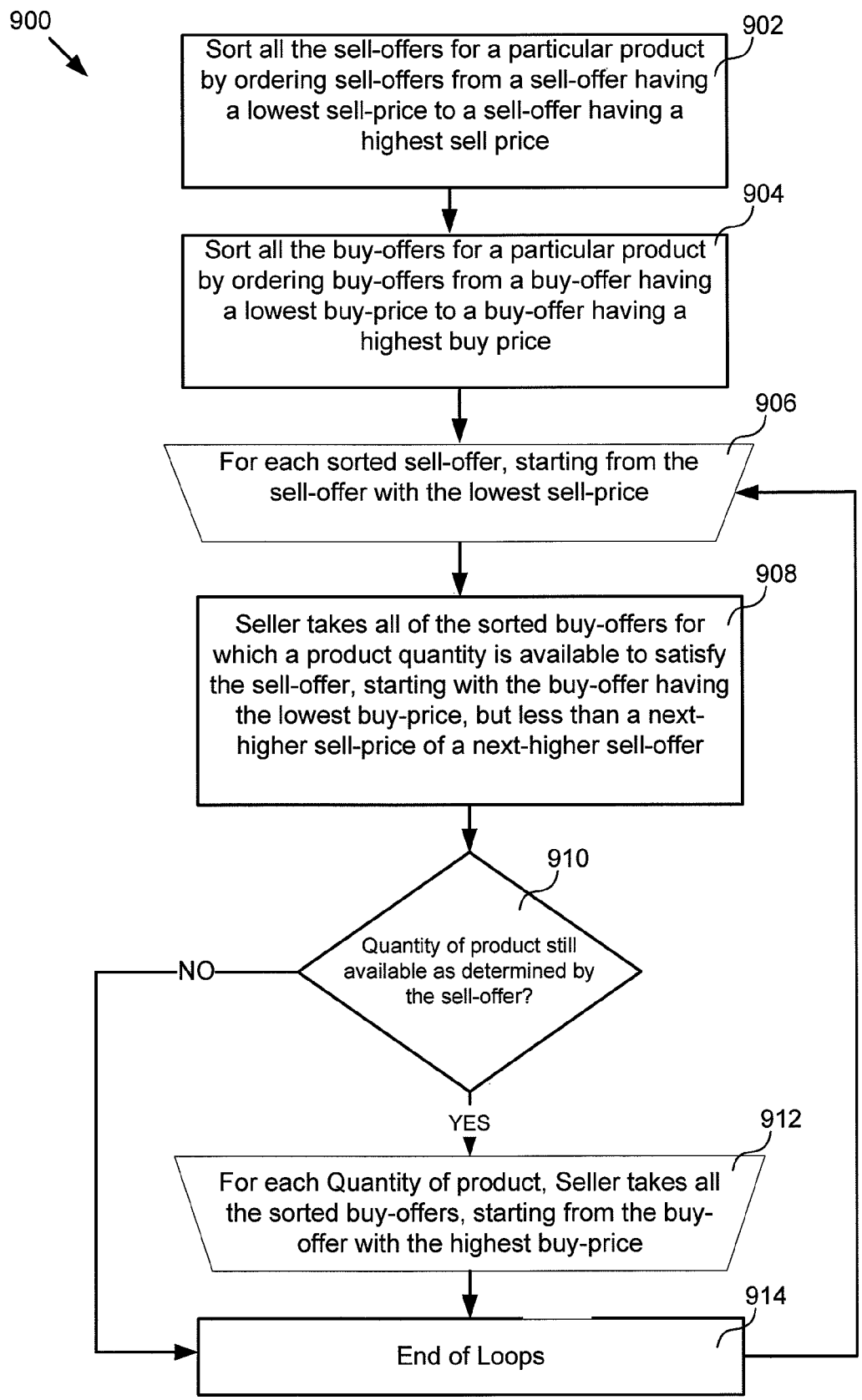
FIG. 9 is a flowchart illustrating how a successful buy-offer and sell-offer are determined at the online marketplace.

FIG. 4 and FIG. 9 illustrate determining successful-offers 450 from the buy-offers 304 and the sell-offers 306 for the product 214 sold in the marketplace. In one embodiment, the sell-offers 306 are sorted 902 such that a sell-offer having a lower sale-price 416 is sorted below a sell-offer having a next-higher sale-price 418. Similarly, the buy-offers 304 are sorted 904 such that a buy-offer having a lower buy-price 422 is sorted below a buy-offer having a next-higher buy-price 424.

Sell-offers are satisfied in an order 908 according to their position in the sorted sell-offers 306. Each sell-offer with a lower sale-price is satisfied before one other sell-offer having a higher sale-price. Additionally, each sell-offer being satisfied is satisfied for every one of the quantity 203 available in that sell-offer before any quantity of the next sale-offer is satisfied.

For example, of the three sell-offers 306 received at the marketplace for selling a product, "sell-offer 1" 416 has the lowest sale-price, followed by "sell-offer 2" 418, and "sell-offer 3" 420. Of the seven buy-offers 304 received for purchasing the product, "buyer-offer 5" 422 has the lowest buy-price, followed by "buy-offer 4" 424, "buy-offer 6" 426, "buy-offer 2" 428, "buy-offer 3" 430, "buy-offer 1" 432, and "buy-offer 7" 444. The processor 102 can determine which of the sell-offers 306 and the buy-offers 304 are successful 450.

In one embodiment, "sell-offer 1" 416 wins all buy-offers 408 having a buy-price equal to and greater than the sale-price 422 of "sell-offer 1" but less than a next-higher sale-price 424 of a next sell-offer 418. In addition, for each quantity 452 remaining after satisfying the buy-offers 408, "sell-offer 1" 416 wins buy-offers 410 having a buy-price equal to and less than a highest buy-price of the submitted buy-offers 304.

However, if "sell-offer 1" 416 is the only sell-offer for the product, "sell-offer 1" 416 wins all buy-offers having a buy-price equal to or greater than the sale-price 422 of the first sell-offer 416 for which there is a sufficient quantity 452 of the product.

This procedure 906 is continued for the remaining sell-offers. For example, "sell-offer 2" 418 wins all buy-offers 412 having a buy-price equal to and greater than the sale-price 424 of "sell-offer 2" for which there is a sufficient quantity 454 of the product. The buy-offer 430 remaining after both the quantity of "sell-offer 1" and "sell-offer 2" are satisfied is won by "sell-offer 3" 420 whose quantity 456 cannot be completely satisfied from the buy-offers 304.

Unsatisfied and partially satisfied sell-offers, "sell-offer 3" 420, are automatically resubmitted to the marketplace server 100 for another round of offering until the remaining quantity is satisfied or until the seller cancels the automatic resubmission of the sell-offer.

In one embodiment, products not listed in the catalogue 214, for example, "used" or one-of-a-kind products can be added to the online marketplace 200. A buyer desiring a product not listed in the catalogue 214 can submit, from the client 110 to the marketplace server 100, a request for the particular product not listed in the catalogue. Other buyers desiring that same product can add requests for the particular product. The buyer requests can be aggregated by the marketplace server 100 and displayed, at the client 110, to potential sellers 210 who can respond to the demand by submitting offers to sell the desired product at the online marketplace 200. Irrespective of the buyer requests, a seller can offer for sell a product not listed in the catalogue 214.

Once a first seller submits an offer for a one-of-a-kind product, other sellers may aggregate sell-offers for products substantially similar to the first seller's product. A lowest sale price of the aggregated, one-of-a-kind or "used" product is displayed 112 at the client 110. A winning buy-offer having a buy-price equal to the lowest sale price wins the product associated with the lowest sale price. After each of the "used" or one-of-a-kind products are sold, the next lowest priced product of the aggregation is displayed at the client of the buyer 212, until all similar aggregated products are sold.

Figure 5:
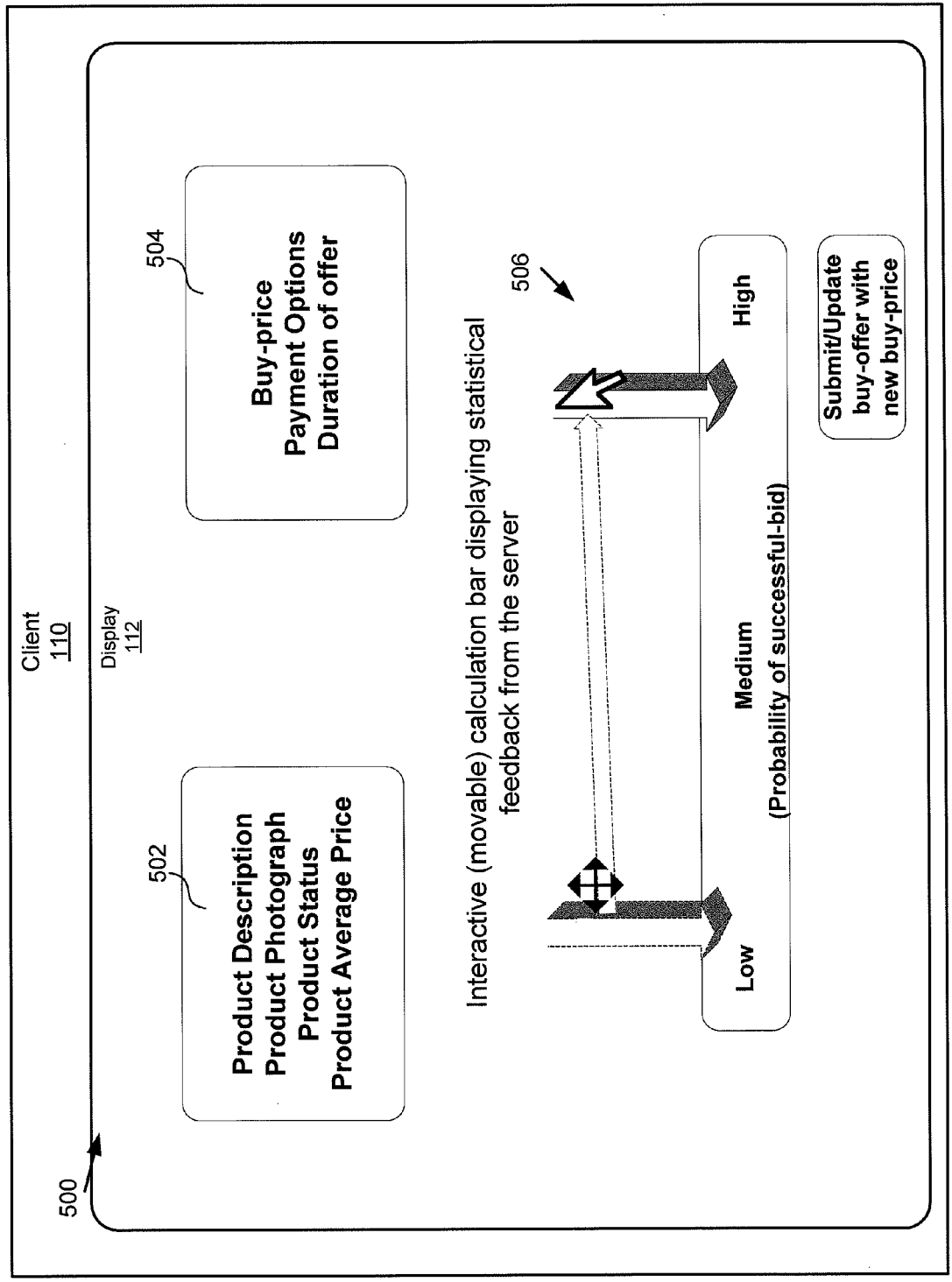
FIG. 5 illustrates a display of a buyer's client depicting a buyer increasing the probability of achieving a successful offer by altering the buy-offer.

FIG. 5 is an example 500 of a display 112 of the client 110 presenting information 502-504 and statistical data 506 from the marketplace server 100 to a buyer 212. The display includes product details 502 such as a product description, product photograph, status of a product currently under bid, and the average price of the product based on historical averages or current bidding. Additionally, specific details 504 of an active buyer-offer 304 are presented, including the buy-price 208, the duration 218 of the buy-offer, and a method of payment.

In one embodiment, the statistics 506 are presented from the marketplace server 100 to the display 112. The statistics provide the buyer feedback of a probability of achieving a successful offer 450. The statistics can be presented to the display as any number of numerical calculations relating to a likelihood of a successful offer or, in one embodiment, a graphical representation of the likelihood of a successful offer is displayed to the buyer.

In another embodiment, the buyer 212 can interact with the statistics 506 in a manner to affect the success of the buyer's offer. For example, a buyer desiring to increase a probability of a successful bid can change a submitted buy-offer 304 by increasing the buy-price 208, increasing the duration 218 or both. Once submitted from the client 110 to the marketplace server 100, the updated offer will update the previously submitted buy-offer 304.

Figure 6:
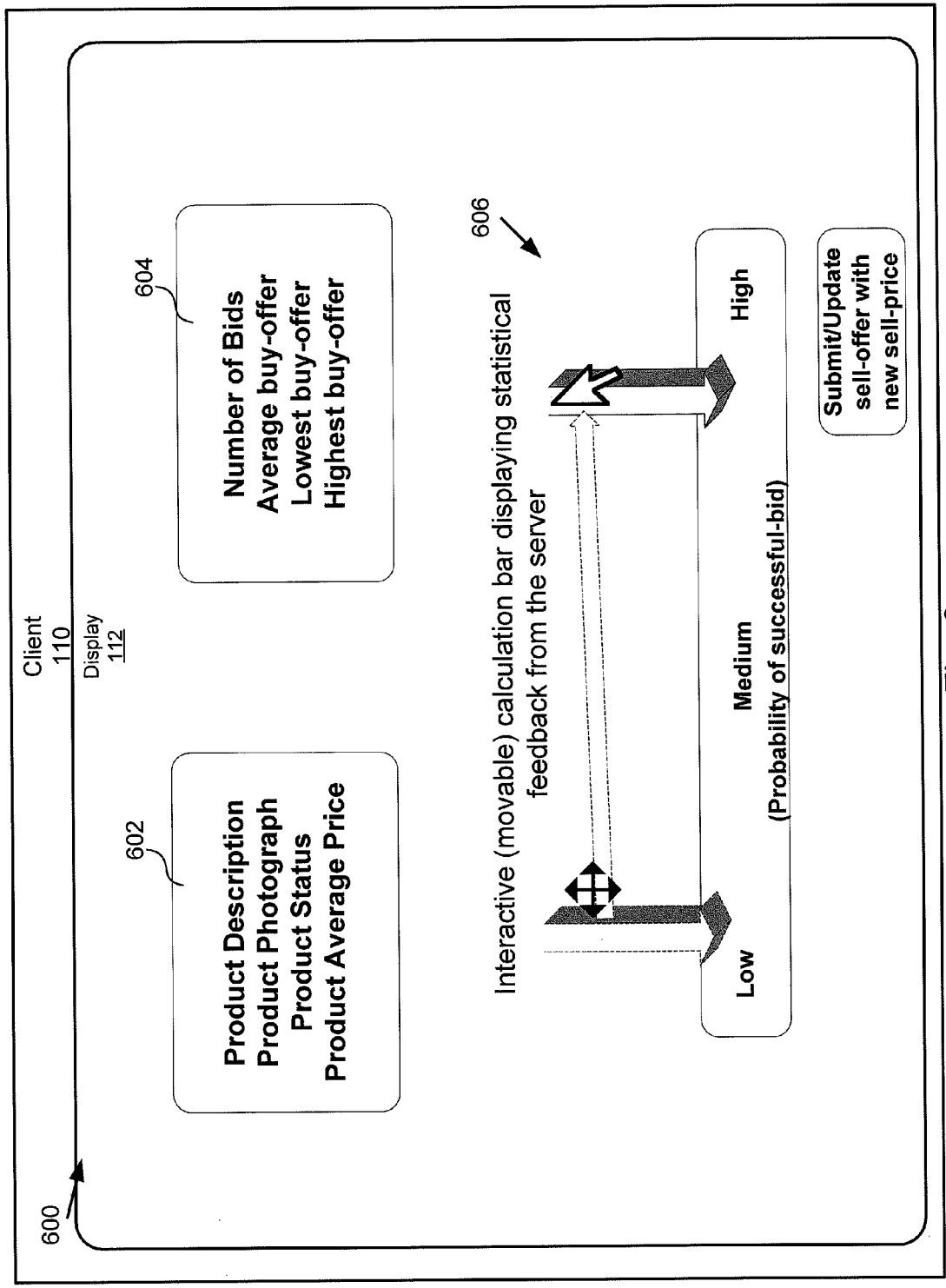
FIG. 6 illustrates a display of a seller's client depicting a seller increasing the probability of achieving a successful offer by altering the sell-offer.

FIG. 6 is an example 600 of the display 112 of the client 110 presenting information 602-604 and statistical data 606 from the marketplace server 100 to a seller 210. The display includes product details 602 such as a product description, product photograph, status of a product currently under bid, and the average price of the product based on historical averages or current bidding. Additionally, specific details 604 of an active sell-offer 304 are presented, including, a total number of buy-bids received for the seller's product, the average buy-price of all the buy-offers submitted for the product 304, and the lowest and highest buy-prices of all the buy-offers submitted for the product.

In one embodiment, statistics 606 are presented from the marketplace server 100 to the display 112. The statistics provide the seller feedback of a probability of achieving a successful offer 450. The statistics can be presented to the display as any number of numerical calculations relating to a likelihood of a successful offer or, in one embodiment, a graphical representation of the likelihood of a successful offer is displayed to the seller.

In another embodiment, a seller 210 can interact with the statistics 506 in a manner to affect the success of the seller's offer. For example, a seller desiring to increase the probability of a successful bid can change a submitted sell-offer 306 by decreasing the sale-price 202. Once submitted from the client 110 to the marketplace server 100, the updated offer will update the previously submitted sell-offer 304.

Figure 7:
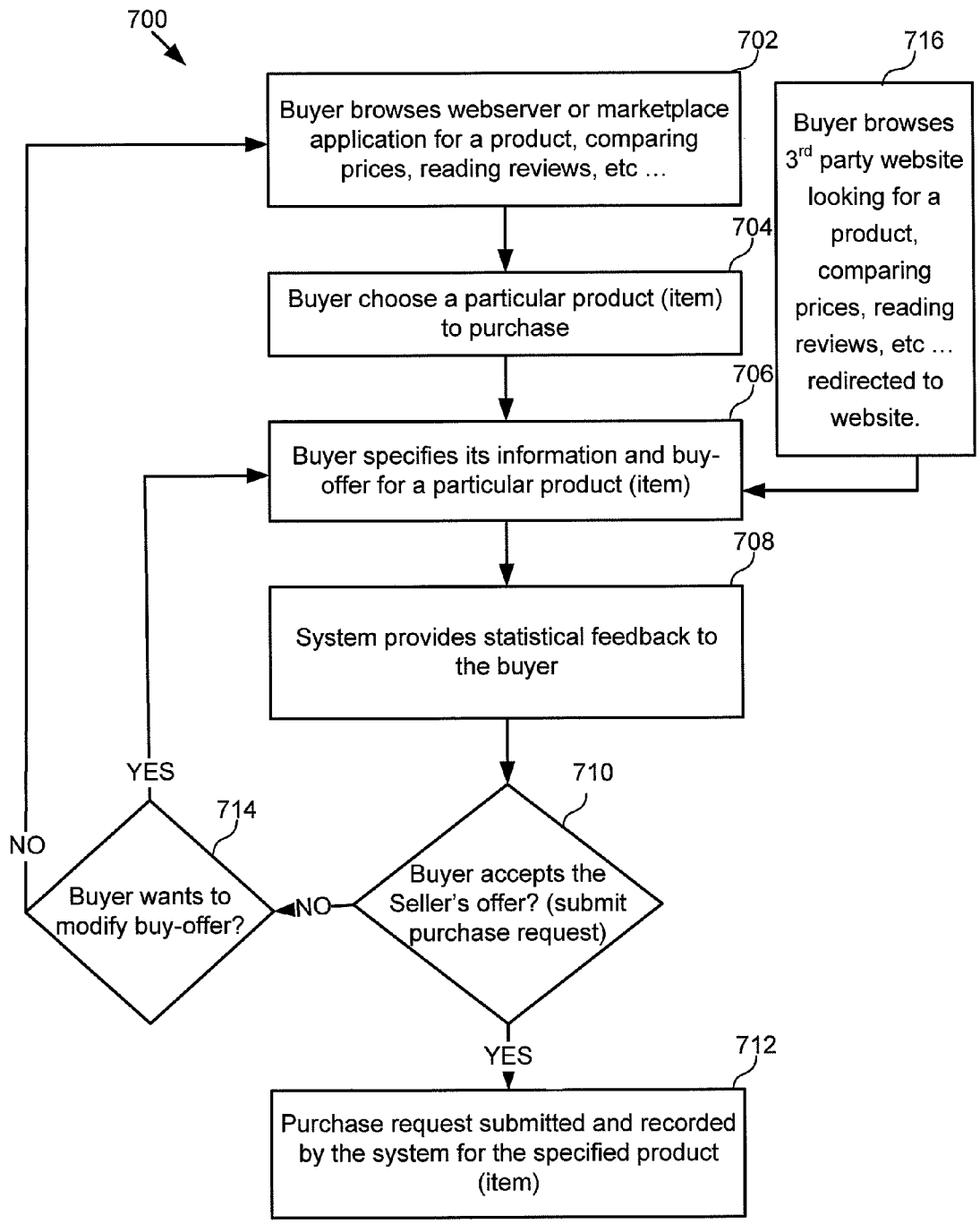
FIG. 7 is a flowchart depicting the buyer's workflow to purchase a product at the online marketplace

FIG. 7 is a process 700 illustrating one embodiment depicting a buyer workflow 702-716 for completing a purchase of a product at the online marketplace. At a browsing-step 702, a buyer browses the marketplace server 100 for a particular product. Next, at a choosing-step 704, the buyer chooses a product for submitting a buy-offer. Based on the product chosen in the choosing-step 704 or being redirected to the marketplace from a redirection-step 716, the seller specifies the terms of a buy-offer including a buy-price and duration, in the buy-offer-step 706. In the statistical-feedback-step 708, the marketplace server provides to the buyer a likelihood of the buyer winning the product. If the buyer agrees to the terms for buying the product at the marketplace, agreement-step 710, then the buy-offer is submitted and recorded by the marketplace server in the submission-step 712. However, if the buyer desires to change the buy-offer based on the statistical-feedback-step 708, the modification-step 714 allows the buyer to further modify the buy-offer at the buy-offer-step 706. Once the buyer is satisfied with the buy-offer, the offer is submitted at the submission-step 712.

Figure 8:
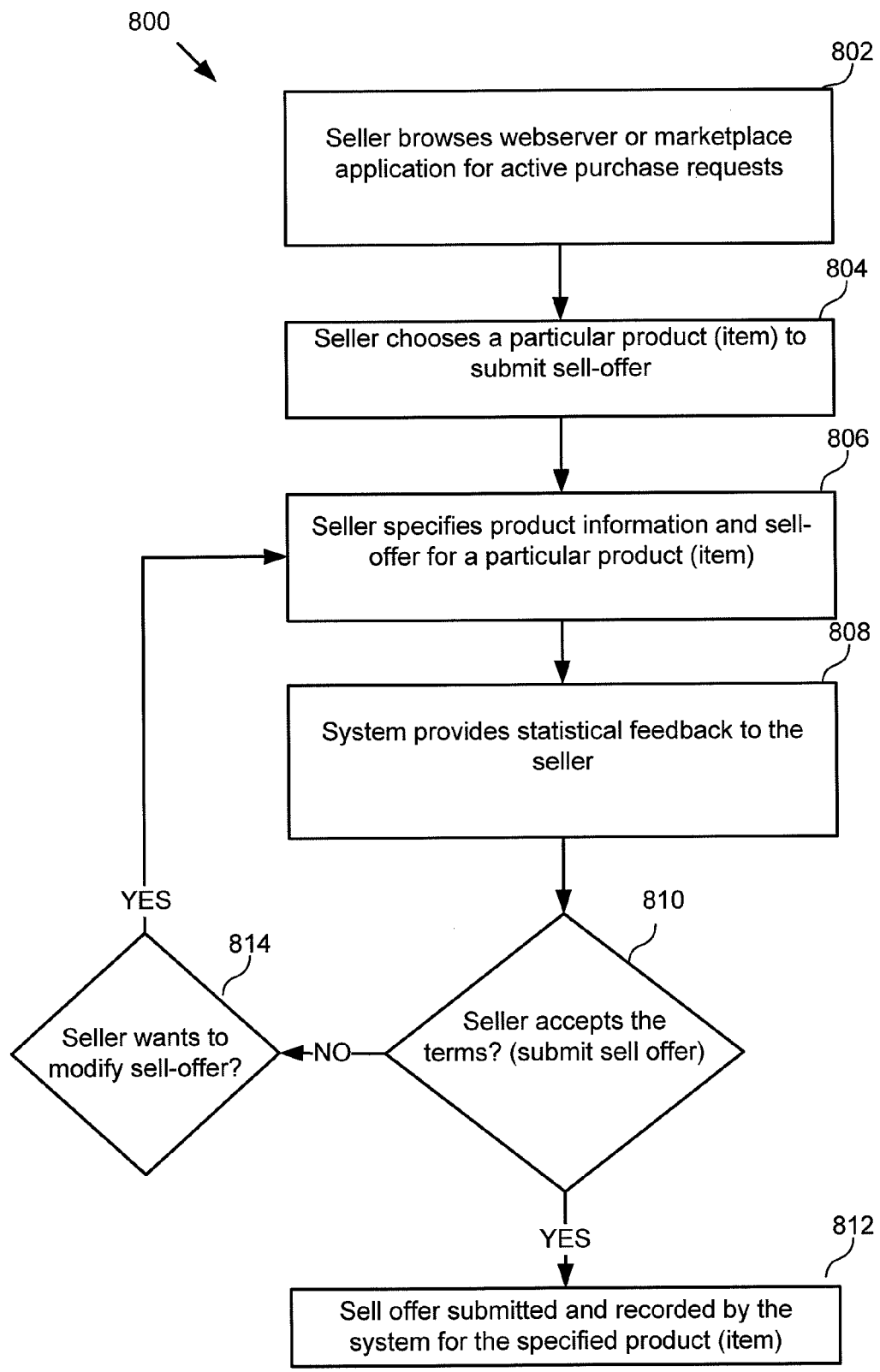
FIG. 8 is a flowchart depicting the seller's workflow to sell a product at the online marketplace.

FIG. 8 is a process 800 illustrating one embodiment depicting a seller workflow 802-814 for completing a sell of a product at the online marketplace. At a browsing-step 802, a seller browses the marketplace server 100 for active buy-offers for a product. Next, at a choosing-step 804, the seller chooses a product for submitting a sell-offer. Based on the product chosen, the seller specifies the terms of a sell-offer and additional product information, in the sell-offer-step 806. In the statistical-feedback-step 808, the marketplace server provides to the seller a likelihood of achieving a successful sell of the product. If the seller agrees to the terms for selling the product at the marketplace, at agreement-step 810, then the sell-offer is submitted and recorded by the marketplace server in the submission-step 812. However, if the seller desires to change the sell-offer based on the statistical-feedback-step 808, the modification-step 814 allows the seller to further modify the sell-offer and product information at the sell-offer-step 806. Once the seller is satisfied with the sell-offer, the offer is submitted at the submission-step 812.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A method comprising:
receiving, at an online marketplace including a plurality of buyers, a plurality of sellers, and a first product, a plurality of buy-offers each from a respective one of the plurality of buyers, wherein each of the plurality of buy-offers is submitted for purchasing the first product and includes a buy-price for the first product, and wherein the first product is available on a marketplace catalogue;
receiving, at the online marketplace, a plurality of sell-offers each from a respective one of the plurality of sellers to sell the first product, wherein each sell-offer of the plurality of sell-offers has:
a sale-price at which to sell the first product, and
a quantity of the first product available to sell at the sale-price; and
determining, at a processor of the online marketplace, a plurality of successful-offers including:
a first set of buy-offers of the plurality of buy-offers, wherein the first set of buy-offers includes a first subset of buy-offers, wherein the buy-offers of the first subset each have a buy-price equal to or greater than a sale-price of a first sell-offer of the plurality of sell-offers to sell the first product, wherein a quantity of the first product available in the first sell-offer is sufficient to satisfy the buy-offers of the first set, wherein the buy-offers of the first subset each have a buy-price equal to or greater than the sale-price of the first sell-offer but less than a second sale-price of a second sell-offer of the plurality of sell-offers, the second sale-price being a next highest sale-price relative to the sale-price of the first sell-offer, and wherein each unsatisfied buy-offer of the first subset of buy-offers having a lowest buy-price is satisfied first.

2. The method of claim 1, wherein the first set of buy-offers of the plurality of buy-offers further includes:
a second subset of one or more buy offers having a buy-price equal to or less than a maximum buy-price of the plurality of buy-offers, wherein the quantity of the first product available in the first sell-offer is sufficient to satisfy the buy-offers of the first subset, and wherein each unsatisfied buy-offer of the second subset having a highest buy-price is satisfied first.

3. The method of claim 1, wherein the successful-offers further include:
a second set of buy-offers of the plurality of buy-offers, wherein the buy-offers of the second set each have:
a buy-price equal to or greater than a sale-price of a second sell-offer of the plurality of sell-offers but less than a lowest buy-price of the first set of buy-offers, when a next-higher sell-offer of the plurality of sell-offers is not submitted for purchasing the first product, and
when the next-higher sell-offer of the plurality of sell-offers is submitted for purchasing the first product, a buy-price equal to or greater than the sale-price of the second sell-offer but less than a next-higher sale-price of the next-higher sell-offer, the next-higher sale-price being the next highest sale-price relative to the sale-price of the second sell-offer, wherein the quantity of the first product available in the second sell-offer is sufficient to satisfy the buy-offers of the second set, and wherein each unsatisfied buy-offer of the second set having a lowest buy-price is satisfied first.

4. The method of claim 3, wherein when the next-higher sell-offer of the plurality of sell-offers is submitted for purchasing the first product, the second set of buy-offers of the plurality of buy-offers further include:
a buy-price less than a minimum buy-price of the first set of buy-offers, wherein the quantity of the first product available in the second sell-offer is sufficient to satisfy the buy-offers of the second set, and wherein each unsatisfied buy-offer of the second set having a highest buy-price is satisfied first.

5. The method of claim 1, wherein the first product in the online marketplace has a unique identifier.

6. The method of claim 5, wherein the unique identifier is a first universal product code (UPC).

7. The method of claim 1, further comprising resubmitting, at the online marketplace, a previously submitted sell-offer that was not successful in a prior transaction, the submission of the previously unsuccessful sell-offer being performed automatically by the online marketplace after the prior transaction.

11

8. The method of claim 1, wherein each buy-offer of the plurality of buy-offers further includes:
a duration of the offer for purchasing the first product, and an option of payment to pay the buy-price for the first product.

9. The method of claim 8, wherein the duration and the buy-price of each buy-offer of the plurality of buy-offers are each configured to be independently increased by a respective one of the plurality of buyers, before the step of determining a successful-offer of the plurality of successful-offers.

10. The method of claim 1, wherein the plurality of buy-offers and the first sell-offer are accepted by the online marketplace to form a plurality of contracts.

11. The method of claim 1, wherein the online marketplace provides
statistical feedback to at least one of:
the plurality of buyers, or
the seller, based on the terms of the first sell-offer and the terms of the plurality of buy-offers submitted to the online marketplace, the statistical feedback encouraging a modification of the terms to increase the probability of obtaining at least one of the successful-offers.

12. The method of claim 11, wherein the statistical feedback is a graphical representation of the probability of obtaining at least one of the successful-offers.

13. The method of claim 1, further comprising:
receiving, at the online marketplace, a plurality of sell-now-requests to sell a second product, wherein the second product is not available on the marketplace catalogue, and wherein each sell-now-request of the plurality of sell-now-requests has a sell-now-price,
displaying, at a client of the online marketplace, a lowest sell-now-price of the plurality of sell-now requests,
determining, at the online marketplace, a first successful-transaction by receiving a first buy-now-request having a buy-now-price equal to the lowest sell-now-price of the plurality of sell-now requests, and
displaying, at the client of the online marketplace, each next-lowest sell-now-price of the plurality of sell-now requests and determining, at the online marketplace, a next successful-transaction by receiving a next buy-now-request having a buy-now-price equal to the next-lowest sell-now-price of the plurality of sell-now requests, after determining the first successful-transaction.

14. The method of claim 1, further comprising:
receiving, at the online marketplace, a plurality of buy-now requests from the plurality of buyers for a third product, wherein the third product is not available on the marketplace catalogue, and wherein each buy-now request of the plurality of buy-now requests has a buy-now-price,
displaying, at a client of a seller, a statistical representation of a demand for the third product, based on the plurality of buy-now requests for the third product, and
sending an alert to a client of a buyer of the plurality of buyers upon an availability of the third product at the online marketplace, based on at least one of:
receiving, at the online marketplace, a sell-now request for selling the third product, or
availability of the third product in the marketplace catalogue.

15. The method of claim 1, wherein the determining of the plurality of successful-offers occurs based on at least one of:
a duration of each buy-offer of the plurality of buy-offers for purchasing the first product, or

12 the quantity of the first product available for sale in the first sell-offer.

16. The method of claim 1, wherein the determining of the plurality of successful-offers occurs based on:
a duration of each buy-offer of the plurality of buy-offers for purchasing the first product, and
the quantity of the first product available for sale in the first sell-offer.

17. The method of claim 1, wherein the online marketplace is an online, consumer electronics marketplace.

18. An online marketplace server comprising:
a communication interface coupled to a communication network, the communication interface configured to receive:
a plurality of buy-offers each from a respective one of a plurality of buyers, wherein each of the plurality of buy-offers is submitted to purchase a product in the online marketplace and include a buy-price for the product, and
a plurality of sell-offers each from a respective one of a plurality of sellers to sell the product based on terms of each of the sell-offers of the plurality of sell-offers, the terms of each sell-offer comprising:
a sale-price at which to sell the product, and
a quantity of the product available to sell at the sale-price;
a processor programmed to determine successful-offers between the plurality of buyers and the seller, the successful-offers comprising:
a first set of buy-offers of the plurality of buy-offers, wherein the first set of buy-offers includes a first subset of buy-offers, wherein the buy-offers of the first subset each have a buy-price equal to or greater than a sale-price of a first sell-offer of the plurality of sell-offers to sell the first product, wherein a quantity of the first product available in the first sell-offer is sufficient to satisfy the buy-offers of the first set, wherein the buy-offers of the first subset each have a buy-price equal to or greater than the sale-price of the first sell-offer but less than a second sale-price of a second sell-offer of the plurality of sell-offers, the second sale-price being a next highest sale-price relative to the sale-price of the first sell-offer, and wherein each unsatisfied buy-offer of the first subset of buy-offers having a lowest buy-price is satisfied first.

19. The online marketplace server of claim 18, wherein the first set of buy-offers of the plurality of buy-offers further includes:
a second subset of one or more buy offers having a buy-price equal to or less than a maximum buy-price of the plurality of buy-offers, wherein the quantity of the product available in the first sell-offer is sufficient to satisfy the buy-offers of the first subset, and wherein each unsatisfied buy-offer of the second subset having a highest buy-price is satisfied first.

20. The online marketplace server of claim 18, wherein the successful-offers further include:
a second set of buy-offers of the plurality of buy-offers, wherein the buy-offers of the second set each have:
a buy-price equal to or greater than a sale-price of a second sell-offer of the plurality of sell-offers but less than a lowest buy-price of the first set of buy-offers, when a next-higher sell-offer of the plurality of sell-offers is not submitted for purchasing the product, and
when the next-higher sell-offer of the plurality of sell-offers is submitted for purchasing the product, a buy-price equal to or greater than the sale-price of the second sell-offer but less than a next-higher sale-price of the next-higher sell-offer, the next-higher sale-price being the next highest sale-price relative to the sale-price of the second sell-offer, wherein the quantity of the product available in the second sell-offer is sufficient to satisfy the buy-offers of the second set, and wherein each unsatisfied buy-offer of the second set having a lowest buy-price is satisfied first.

21. The online marketplace of claim 20, wherein when the next-higher sell-offer of the plurality of sell-offers is submitted for purchasing the product, the second set of buy-offers of the plurality of buy-offers further include:
  a buy-price less than a minimum buy-price of the first set of buy-offers, wherein the quantity of the product available in the second sell-offer is sufficient to satisfy the buy-offers of the second set, and wherein each unsatisfied buy-offer of the second set having a highest buy-price is satisfied first.

22. The online marketplace server of claim 18, further comprising a storage unit to record the plurality of buy-offers and the first sell-offer.

23. The online marketplace server of claim 18, wherein the product in the online marketplace is referenced by a universal product code (UPC).

24. The online marketplace server of claim 18, wherein the processor is further configured to send, via the communication network, to a client:
  statistical feedback based on at least one of:
    the first sell-offer, or
    the plurality of buy-offers submitted to the online marketplace, the statistical feedback encouraging a modification of the terms to increase the probability of obtaining at least one of the successful-offers, and
  a status of the product, the status indicating the availability of the product to receive a buy-offer of the plurality of buy-offers.

25. The online marketplace server of claim 24, wherein the statistical feedback has an average price of the product, the average price based on the plurality of buy-offers submitted to purchase the product in the online marketplace.

26. The online marketplace server of claim 24, wherein the client is configured to display, at a screen of the client, the statistical feedback to at least one of:
  a buyer of the plurality of buyers, or
  the seller.

27. The online marketplace server of claim 24, wherein the statistical feedback is sent for delivery to the client in a format to display on a screen of the client.

28. The online marketplace server of claim 27, wherein the format of the statistical feedback displayed to the screen is an interactive graphical calculation-bar.

29. An application service provider system producing an online marketplace, the system comprising:
  a server, the server further comprising:
    a communication interface coupled to a communication network, the communication interface configured to receive:
      a plurality of buy-offers each from a respective one of a plurality of buyers, wherein each of the plurality of buy-offers is submitted to purchase a product in the online marketplace and include a buy-price for the product, and
      a plurality of sell-offers each from a respective one of a plurality of sellers to sell the product based on terms of each sell-offer of the plurality of sell-offers, the terms of each sell-offer comprising:
        a sale-price at which to sell the product, and
        a quantity of the product available to sell at the sale-price;
    a processor, at the server, programmed to determine successful-offers between the plurality of buyers and one or more of the plurality of sellers, the successful-offers comprising:
      a first set of buy-offers of the plurality of buy-offers, wherein the first set of buy-offers includes a first subset of buy-offers, wherein the buy-offers of the first subset each have a buy-price equal to or greater than a sale-price of a first sell-offer of the plurality of sell-offers to sell the first product, wherein a quantity of the first product available in the first sell-offer is sufficient to satisfy the buy-offers of the first set, wherein the buy-offers of the first subset each have a buy-price equal to or greater than the sale-price of the first sell-offer but less than a second sale-price of a second sell-offer of the plurality of sell-offers, the second sale-price being a next highest sale-price relative to the sale-price of the first sell-offer, and wherein each unsatisfied buy-offer of the first subset of buy-offers having a lowest buy-price is satisfied first; and
    a client, the client configured to send for delivery to the server at least one of:
      a buy-offer of the plurality of buy offers, or
      the first sell-offer.

30. The system of claim 29, wherein the first set of buy-offers of the plurality of buy-offers further include:
  a second subset of one or more buy offers having a buy-price equal to or less than a maximum buy-price of the plurality of buy-offers, wherein the quantity of the product available in the first sell-offer is sufficient to satisfy the buy-offers of the first subset, and wherein each unsatisfied buy-offer of the second subset having a highest buy-price is satisfied first.

31. The system of claim 29, wherein the successful-offers further include:
  a second set of buy-offers of the plurality of buy-offers, wherein the buy-offers of the second set each have:
    a buy-price equal to or greater than a sale-price of a second sell-offer but less than a lowest buy-price of the first set of buy-offers, when a next-higher sell-offer of the plurality of sell-offers is not submitted for purchasing the product, and
    when the next-higher sell-offer of the plurality of sell-offers is submitted for purchasing the product, a buy-price less than the next-higher sale-price of the next-higher sell-offer, the next-higher sale-price being the next highest sale-price relative to the sale-price of the second sell-offer, wherein the quantity of the product available in the second sell-offer is sufficient to satisfy the buy-offers of the second set, and wherein each unsatisfied buy-offer of the second set having a lowest buy-price is satisfied first.

32. The system of claim 31, wherein when the next-higher sell-offer is submitted for purchasing the product, the second set of buy-offers of the plurality of buy-offers further include:
  a buy-price less than a minimum buy-price of the first set of buy-offers, wherein the quantity of the product available in the second sell-offer is sufficient to satisfy the buy-offers of the second set, and wherein each unsatisfied buy-offer of the second set having a highest buy-price is satisfied first.

33. The system of claim 29, wherein the client is further configured to receive:
  statistical feedback based on at least one of:
    the first sell-offer, or the plurality of buy-offers submitted to the online marketplace, the statistical feedback encouraging a modification of the terms to increase the probability of obtaining at least one of the successful-offers, and a status of the product, the status indicating the availability of the product to receive a buy-offer of the plurality of buy-offers.

34. The system of claim 33, wherein the statistical feedback is displayed on a screen of the client, the displayed statistical feedback providing a representation of the probability of obtaining at least one of the successful-offers.

35. The system of claim 33, wherein the status of the product is displayed on a screen of the client.

36. The system of claim 33, wherein the statistical feedback has an average price of the product, the average price based on the plurality of buy-offers submitted to purchase the product in the online marketplace.

37. A system for producing an online marketplace, the system comprising:

a means for receiving, at an online marketplace including a plurality of buyers, a plurality of sellers, and a first product, a plurality of buy-offers each from a respective one of the plurality of buyers, wherein each of the plurality of buy-offers is submitted for purchasing the first product and includes a buy-price for the first product, and wherein the first product is available on a marketplace catalogue;

a means for receiving, at the online marketplace, a plurality of sell-offers each from a respective one of the plurality of sellers to sell the first product, wherein each sell-offer of the plurality of sell-offers has:

a sale-price at which to sell the first product, and a quantity of the first product available to sell at the sale-price; and a means for determining, at a processor of the online marketplace, a plurality of successful-offers including:

a first set of buy-offers of the plurality of buy-offers, wherein the first set of buy-offers includes a first subset of buy-offers, wherein the buy-offers of the first subset each have a buy-price equal to or greater than a sale-price of a first sell-offer of the plurality of sell-offers to sell the first product, wherein a quantity of the first product available in the first sell-offer is sufficient to satisfy the buy-offers of the first set, wherein the buy-offers of the first subset each have a buy-price equal to or greater than the sale-price of the first sell-offer but less than a second sale-price of a second sell-offer of the plurality of sell-offers, the second sale-price being a next highest sale-price relative to the sale-price of the first sell-offer, and wherein each unsatisfied buy-offer of the first subset of buy-offers having a lowest buy-price is satisfied first.

* * * * *